(12) United States Patent
de Groot et al.

(10) Patent No.: US 7,555,752 B2
(45) Date of Patent: Jun. 30, 2009

(54) CONFIGURABLE LEVELS OF SOURCE CONTROL FOR THE CONFIGURATION OF A PROCESS AUTOMATION SYSTEM

(75) Inventors: Erik de Groot, Huizen (NL); Jeffrey B. Scott, Lexington, VA (US)

(73) Assignee: Honeywell International Inc., Morristown, NJ (US)

( * ) Notice: Subject to any disclaimer, the term of this patent is extended or adjusted under 35 U.S.C. 154(b) by 527 days.

(21) Appl. No.: 10/729,772

(22) Filed: Dec. 8, 2003

(65) Prior Publication Data

US 2005/0125080 A1    Jun. 9, 2005

(51) Int. Cl.
G06F 9/44 (2006.01)
G06F 12/00 (2006.01)
G06F 17/22 (2006.01)

(52) U.S. Cl. ............. 717/170; 717/122; 707/203; 715/229

(58) Field of Classification Search ............. 717/120, 717/121, 122, 170, 113
See application file for complete search history.

(56) References Cited

U.S. PATENT DOCUMENTS

| | | | | |
|---|---|---|---|---|
| 6,115,646 A * | 9/2000 | Fiszman et al. | ............. | 700/181 |
| 6,272,678 B1 * | 8/2001 | Imachi et al. | ............... | 717/122 |
| 6,449,624 B1 * | 9/2002 | Hammack et al. | ............ | 707/203 |
| 6,662,357 B1 * | 12/2003 | Bowman-Amuah | ......... | 717/120 |
| 6,754,885 B1 * | 6/2004 | Dardinski et al. | ............ | 717/113 |
| 6,971,093 B1 * | 11/2005 | Spring | ......................... | 717/170 |
| 2003/0156719 A1 * | 8/2003 | Cronce | ........................ | 380/256 |

OTHER PUBLICATIONS

Modelsim Product Comparision (http://www.model.com).*
"Experion PKS", Honeywell, Dec. 2003, pp. 1-47. Online retrieved at <http://kip.industry.su/honeywell/SYSTEMS/ExperionPKS/Eng/EP03-300-200_v1_0.pdf>.*
"Software configuration management in agile methods", J. Koskela, Dec. 2003, pp. 1-58. Online retrieved at <http://www.vtt.fi/inf/pdf/publications/2003/P514.pdf>.*

* cited by examiner

*Primary Examiner*—Tuan Q Dam
*Assistant Examiner*—Thuy Dao
(74) *Attorney, Agent, or Firm*—Ohlandt, Greeley, Ruggiero & Perle, L.L.P.

(57) ABSTRACT

Configurable levels of source control for the configuration of a process automation system are enabled through a preference selection or license. A user that starts with a certain level of source control may later change the level. Manually entered version information is overwritten if the user starts with a basic source control system after using a manual source control system. In the basic source control system, the increment of the version number is based on the significance of the change, where a parameter change in an existing function block is minor. When the user upgrades to full source control, the existing version numbers are maintained and the automated increment is based on the significance of the change determined by the user.

23 Claims, 8 Drawing Sheets

LEVEL 1

SYSTEM: CONTROL MODULE Block, pidloop -Parameters [project]

Main | Server History | Server Displays

Name: pidloop
Desprition:
Eng: Units:
Keyword:

Execution Period: DEFAULT
Execution Phase: -1
Unit Text:
Version: — 102

Enable Alarming Options: ☑
Execution Order in CEE: 10

SCM Option: NONE
SCM Name:

Fieldbus Specific
Execution Order in CEE: 10
Side Count: 2

FF Execution Period: 15

☐ Show Parameter Names

OK | Cancel | Help

Version Properties

| | |
|---|---|
| Name: | CM_1_34_INST —— 300 |
| Version: | 3.00 —— 302 |
| Status: | Checked-in |
| Comment: | Fixed alarm limit |
| Created by: | Experion PKS User |
| Created on: | 11/7/2003 11:37:53 AM |
| Last modified by: | Experion PKS User |
| Last modified on: | 11/7/2003 11:39:38 AM |

Qualification State Configuration

Current state: Implemented  [Change]

Revert Label Configuration

| # | Applied revent labels |
|---|---|
| | |

[Apply/Remove Labels...]

CONFIGURABLE LEVELS OF SOURCE CONTROL FOR THE CONFIGURATION OF A PROCESS AUTOMATION SYSTEM

BACKGROUND OF THE INVENTION

1. Field of the Invention

The present disclosure generally relates to source control and process automation systems. In particular, the present disclosure relates to version control, regulated industry, development, qualification, process automation, and other applications and features.

2. Discussion of the Background Art

Source control is also known as configuration management, version control, and change management. Source control is a discipline of making changes to source code in a planned and systematic fashion. The purpose of source control is to formally control the integrity of artifacts (items) and activities (tasks). In a source control system, objects are checked-out, edited, and then checked-in. Each time an object is checked-in, it is given a version number. Over time, a history of changes is created for the objects under the control of the source control system.

The items under control in a source control system include objects, such as control strategies. In object-oriented programming (OOP), objects are abstractions used in designing a program and they are also the units of code that are eventually derived from the design process. In between, each object is made into a generic class of objects and even more generic classes are defined so that objects can share models and reuse the class definitions in their code. Each object is an instance of a particular class or subclass with the class' own methods or procedures and data variables. Thus, objects typically exist in a hierarchy of objects with parent and child relationships. An object is usually a binary, text, or other type of file.

Process control systems are also known as process automation systems and are used to control and monitor complex processes in many types of industrial settings, including refineries, pharmaceuticals, power and chemical plants, and pulp, paper and printing mills. One example is Experion PKS™ available from Honeywell.

Different users of process automation systems have different needs in regard to source control of the application configuration in the control system. On one end of the spectrum are users that do not need to track any changes or versions. On the other end are users, often in regulated industries, that need very tight control over the change and version management of development projects.

There is a need for different levels of source control in a process control system that are capable of being enabled according to user need, such as manual source control, basic source control, and full source control.

SUMMARY OF THE INVENTION

The present invention has many aspects and is directed to configurable levels of version control for the configuration of a process automation system that fulfills the above needs and more.

One aspect is a method of source control. A level of source control is enabled from a selection of at least two levels. A version number of an object is set either automatically or manually, depending on the level. In some embodiments, the method includes providing a capability to switch the level of source control to another level. In some embodiments, automatically setting the version number is based on the degree of change to the object. In some embodiments, the method includes storing attributes associated with the object in a database. In some embodiments, the object is a control strategy loadable to a controller in a process control system.

Another aspect is a process control system, comprising a computer, a network, and a controller. The computer has a source control system with a selectable level of source control. The network couples the computer to the controller. At least one control strategy in the source control system is loadable from the computer to the controller. In some embodiments, the system includes a database to store source control information associated with the control strategy, including a version number. In some embodiments, the selectable level of source control is no source control and a version number is entered manually when the control strategy is saved. In some embodiments, the selectable level of source control is basic source control and a version number is automatically incremented when the control strategy is saved. In some embodiments, the selectable level of source control is full source control and a version number is automatically incremented when the control strategy is checked-in. In some embodiments, the selectable level of source control is a preference, a license, an installation configuration, or a user interface.

Another aspect is a method for providing a source control system for a process control system. A selection from at least two levels of source control is received. A user-enterable version number is provided when an object is stored in the source control system, if the selection is a first level. An automatically incremented version number is provided when an object is stored, if the selection is a second level. In some embodiments, an automatically incremented version number is provided when the object is checked-in, if the selection is a third level. In some embodiments, the selection is changed to another of the levels of source control. In some embodiments, attributes of the object are updated based on the selection.

A technical solution and technical effect is providing for levels of source control in a process control system where the levels are capable of being enabled according to user need. Another technical solution and technical effect is providing an option of three specific levels, manual source control, basic source control, or full source control. Thus, there is increased flexibility and adaptability.

BRIEF DESCRIPTION OF THE DRAWINGS

These and other features, aspects, and advantages of the present disclosure will become better understood with reference to the following description, appended claims, and drawings where:

DETAILED DESCRIPTION OF THE PREFERRED EMBODIMENT

Figure 1:
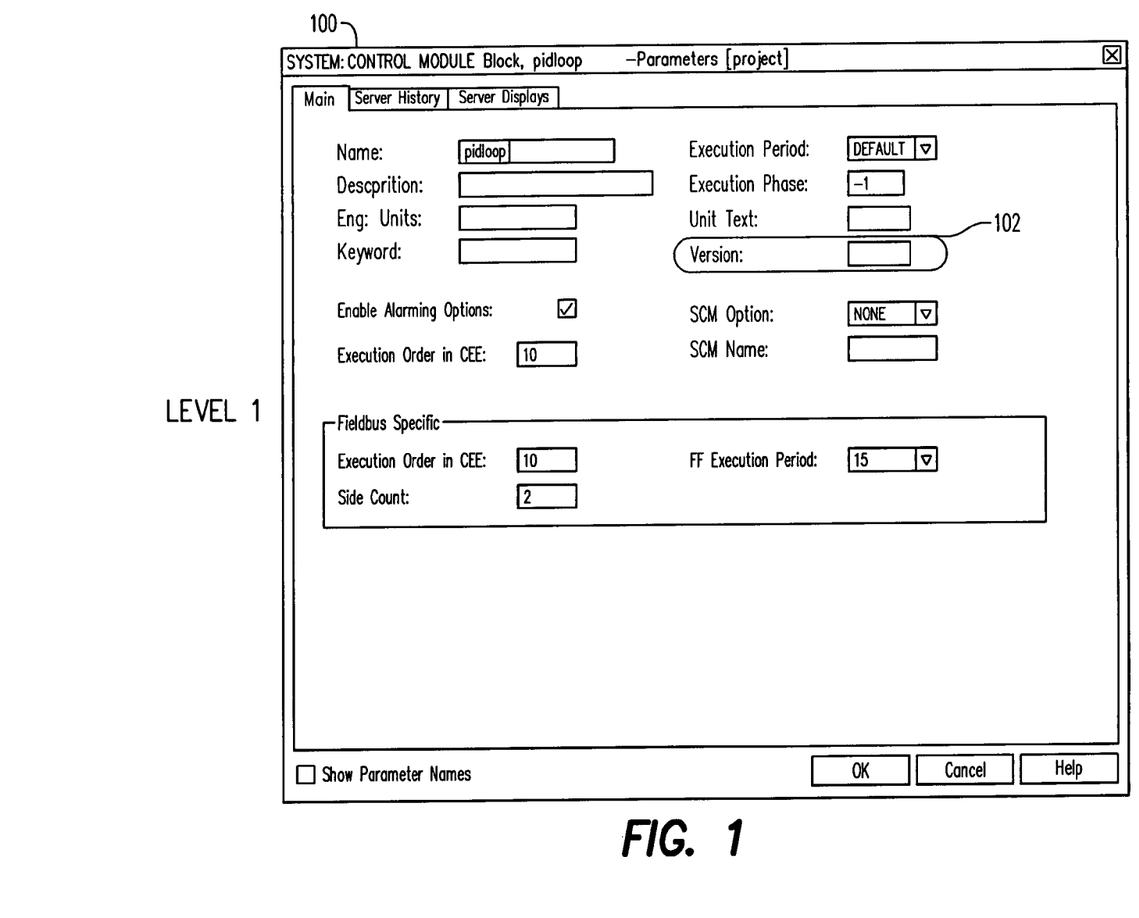
FIG. 1 is a screenshot of an example user interface for a source control system having a first level of source control.
Figure 2:
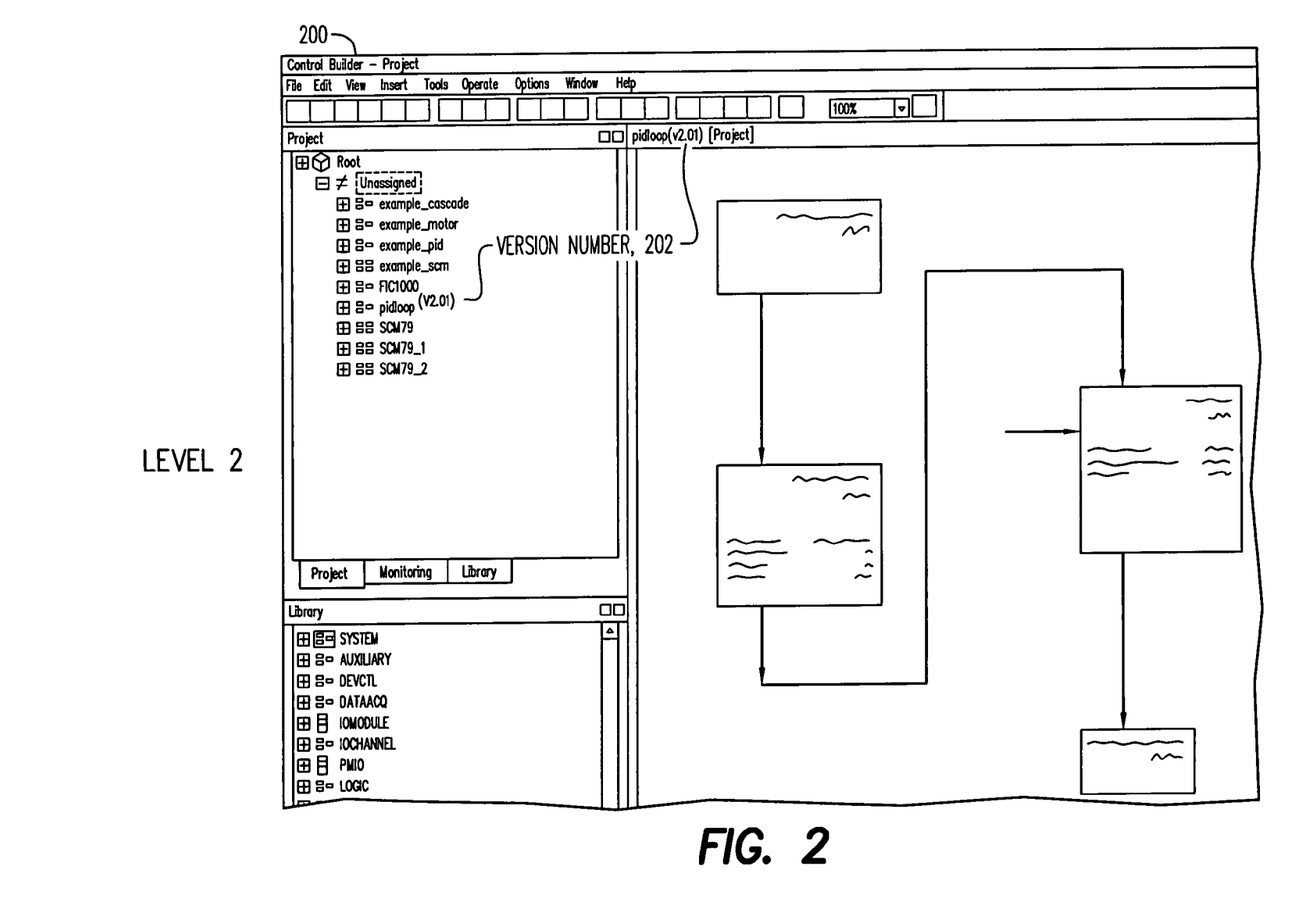
FIG. 2 is a screenshot of an example user interface for a source control system having a second level of source control.
Figure 3:
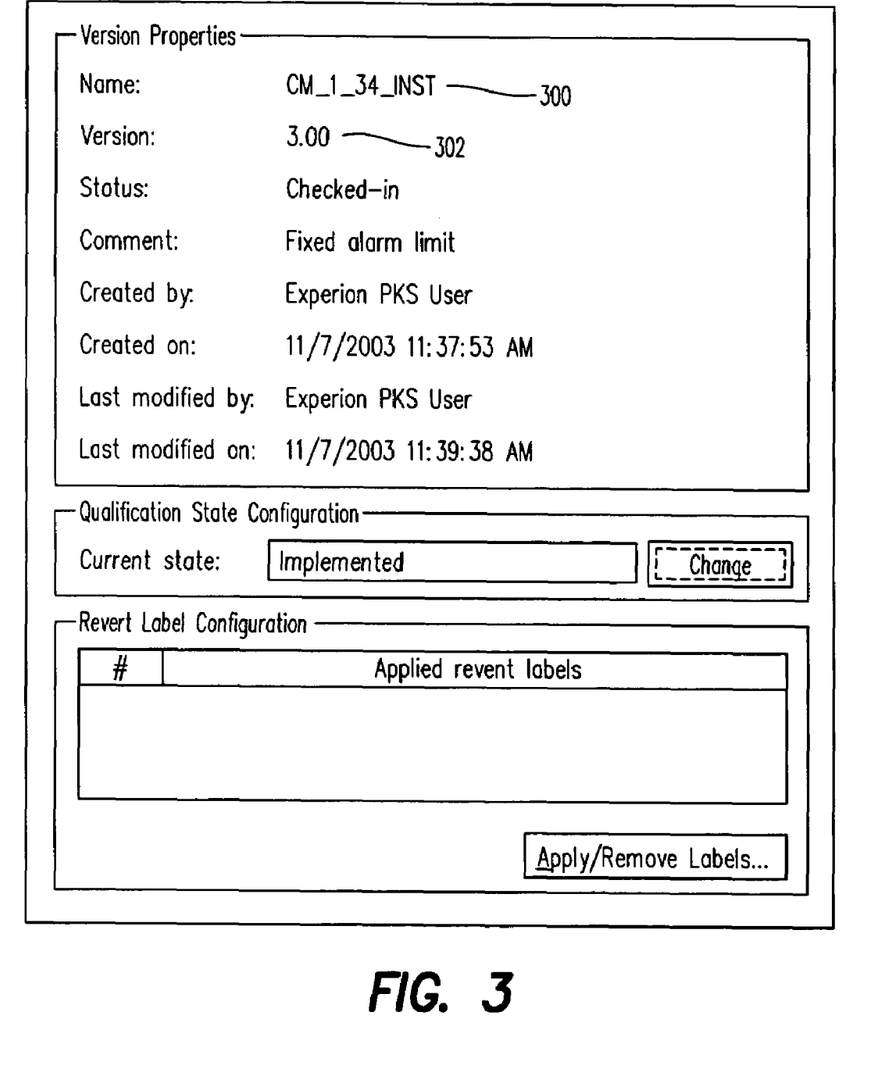
FIG. 3 is a screenshot of an example user interface for a source control system having a third level of source control.

FIGS. 1, 2, and 3 show an example source control system with three levels of source control. The present invention is not limited to a selection of three levels. A range of any number of selectable levels of source control ranging from a low level of control to a high level of control are used in some embodiments. In this example, a first level of source control is called manual or "none", a second level of source control is called "basic", and a third level of source control is called "full". The selection of the level of source control may be performed in any manner, such as through a license, registration, installation, configuration, user interface or other selection method or combination of methods.

In this example system, there are three levels of source control from low to high: level one is manual source control ("none"); level two is "basic" source control; and level three is "full" source control. With manual source control, the user manually maintains a version number as part of each control object. With "basic" source control, source control is enabled through a preference menu and version numbers are automatically incremented when a control object changes. With "full" source control, the version number is not only incremented but a repository of all versions of each control object is maintained. Additional features for full source control include security to prevent unauthorized changes, a full audit trail of interactions per control object, and enforcement of a user-defined development life cycle. The life cycle may vary from a very simple life cycle to an extensive and detailed life cycle depending on the industry. With all three levels in this example system, the system maintains parameters related to the creation, revision date, and user.

In this example system, automatic increments of a version number for basic source control are determined by the system. An increment is either a minor increment, such as +0.01 for minor changes or a major increment, such as +1 for major changes. Examples of major changes are addition or deletion of a function block and addition or deletion of a parameter connection. A function block is a control object characterized by a set of parameters and an algorithm. A parameter connection occurs when one object defines a parameter that is used in another object. In this example, the version number is shown when an object is displayed or a report is printed.

In this example system, other operations can also result in changes to a version number such as copying, and importing. With copying, the new object's version number is zero and the revision date is the current date. With importing, the object takes the version number and date from an import file.

FIG. 1 is a screenshot of an example user interface for a source control system having a first level of source control. FIG. 1 shows a main user interface for an input/output (I/O) module 100. The I/O module is one example of a number of objects under control of the source control system in this example. Other objects in this example include controller objects, fieldbus interface modules (FIMs), control execution environments, and container blocks. The present invention is not limited to these types of objects. The objects in the source control system are manually assigned version numbers by a user in this first level of source control. In FIG. 1, there is an entry space 102 for the user to enter a version number for this I/O module. The characteristics of this example system with "none" or manual source control, include user-entered text for a version, a created-by name set by a first save changes operation, a modified-by name set by a save changes operation, a date-created date set by a first save changes operation, a version date set by a save changes operation, comments that are user-entered, and no version history. A save changes operation is the processing of a request by a user to the source control system to store changes to an object.

FIG. 2 is a screenshot of an example user interface for a source control system having a second level of source control. FIG. 2 shows a project view user interface 200 displaying information for a project named "pidloop". The project has a version number associated with it and displayed next to the project name 202. The characteristics of this example system with "basic" source control include automatically generated version numbers, version numbers incremented upon saving changes, (e.g., +0.01 for minor changes and +1 for major changes), a created-by name set by a first save changes operation, a modified-by name set by a save changes operation, a date-created date set by a first save changes operation, a version date set by a save changes operation, comments entered by a user, no version history, and a version number displayed in trees, chart titles, and other places.

FIG. 3 is a screenshot of an example user interface for a source control system having a third level of source control. FIG. 3 shows information for an object named "CM_1_34_INST" 300 having a version number 302. The characteristics of this example system with "full" source control include a qualification life cycle support, a version control system toolbar and menu item, automatically generated version numbers, version numbers incremented on check-in, (e.g., +0.01 for minor changes and +1 for major changes determined by the user), version number shown in trees and chart titles, a created-by name set by a first check-in to the source control system, a modified-by name set by a check-in, a date-created date set by a check-in, a date created set by a first check-in, a version date set by a check-in, comments entered by a user, and a full version history and audit trail.

A summary of the features associated with the three levels of source control in this example system are shown in Table 1. VERSIONNUM is a parameter associated with an object containing a version number. QUALSTATE is a parameter associated with an object containing a qualification state or life cycle phase. BLCKCOMMENT1 . . . BLCKCOMMENT4 are parameters associated with an object containing a comment associated with an object.

TABLE 1

Summary of Version Parameter Behavior

| Parameter or Feature | None | Basic | Full |
|---|---|---|---|
| Enabling mechanism | None | Set via a system preference | Set via a license |

TABLE 1-continued

Summary of Version Parameter Behavior

| Parameter or Feature | None | Basic | Full |
|---|---|---|---|
| Display of version number in titles | None | VERSIONNUM is used as source of displayed number | VERSIONNUM is used as source of displayed number |
| Version menu and toolbar | No | No | Yes |
| VERSION | User entered text | Formatted string of VERSIONNUM | Formatted string of VERSIONNUM |
| VERSIONNUM | Not used | Auto-incremented by save changes | Incremented when checked in to the source control system, major/minor set by user |
| CREATEDBY | Set by first save changes | Set by first save changes | Set when first checked in |
| MODIFIEDBY | Set by save changes | Set by save changes | Set when checked in |
| DATECREATED | Set by first save changes | Set by first save changes | Set when first checked in |
| VERSIONDATE | Set by save changes | Set by save changes | Set when checked in |
| QUALSTATE | Not used | Not used | Set by user (only when already checked in) |
| BLCKCOMMENT1 ... BLCKCOMMENT4 | User entered | User entered | User entered |

Figure 4:
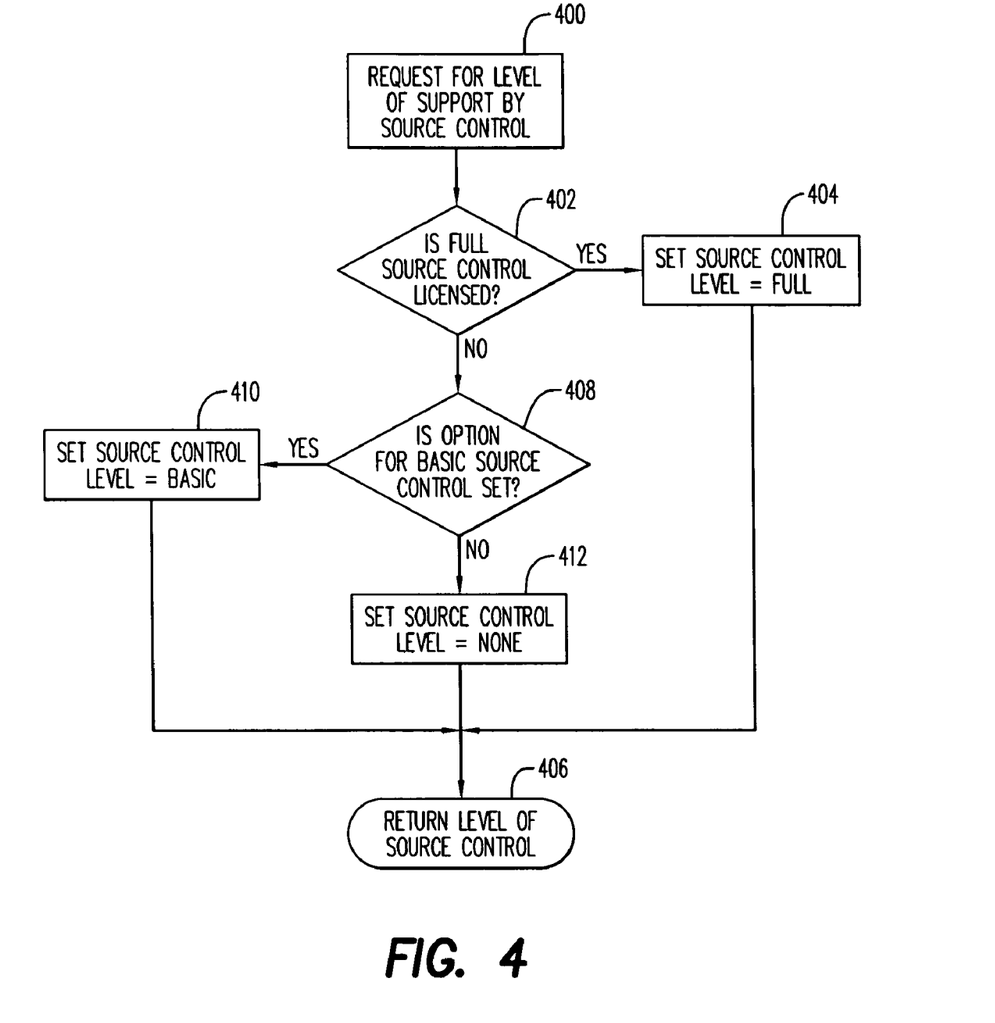
FIG. 4 is a flow chart of an example method for providing configurable levels of support for a source control system.

FIG. 4 shows an example method for providing configurable levels of support for a source control system. In step 400, a request for a particular level of support is received by the source control system. In step 402, it is determined if full source control is licensed. In some embodiments, a level of source control is determined by a license. In other embodiments, a user interface provides the selection of level of source control. In still other embodiments, other methods of selecting a level of source control are used. If full source control is licensed, then in step 404, the source control level is set to "full" and control goes to step 406 where the level of source control is returned. Otherwise, if full source control is not licensed, then control flows to step 408. In step 408, it is determined if the option for basic source control is set. If so, control flows to step 410, where the source control level is set to "basic" and control goes to step 406 where the source control level is returned. Otherwise, if the option for basic source control is not set, control flows from step 408 to step 412. In step 412, the source control level is set to "none" and control goes to step 406, where the source control level is returned. In various embodiments, there are less than or more than three levels and the levels have various names or numbers.

Figure 5:
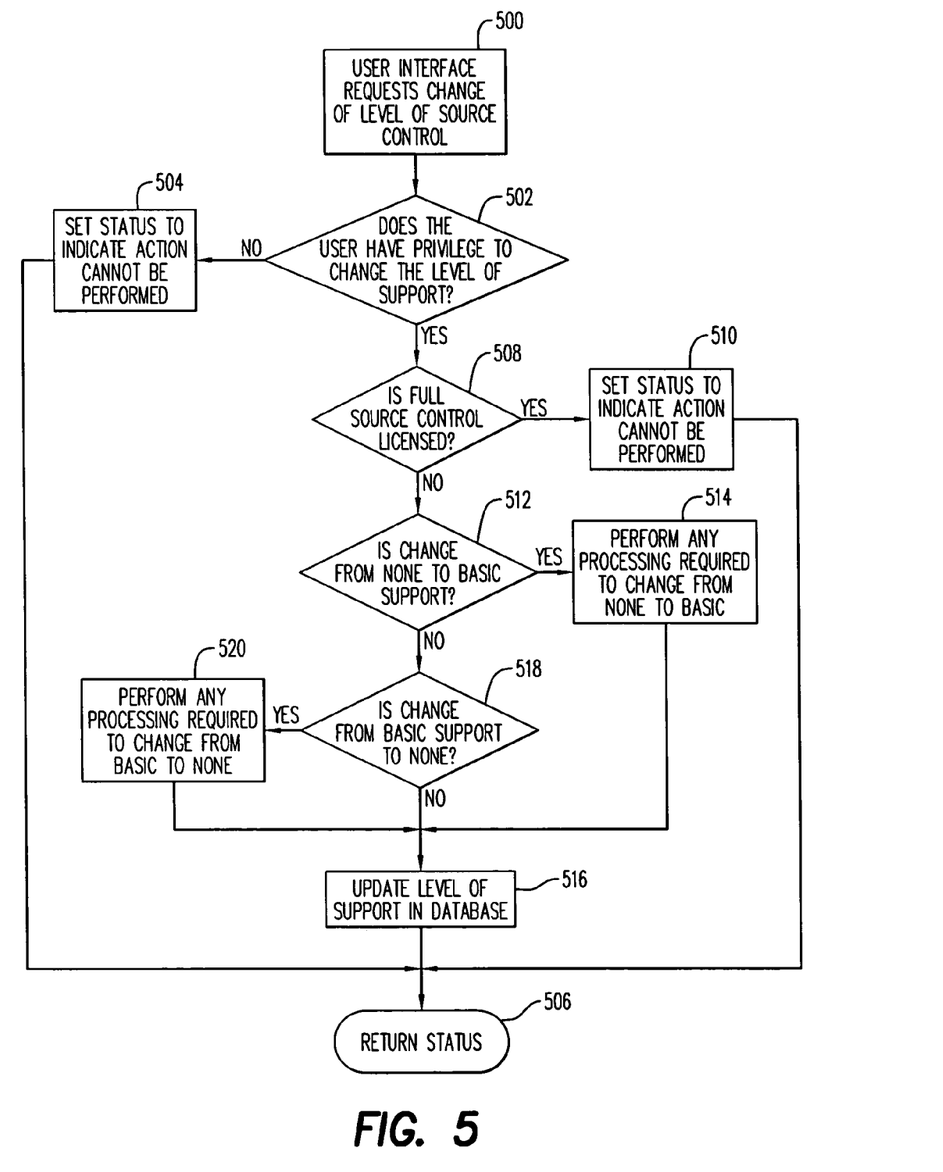
FIG. 5 is a flow chart of an example method for changing configurable levels of support for a source control system.

FIG. 5 is a flow chart of an example method for changing configurable levels of support for a source control system. In step 500, a request to change the level of source control is received by the source control system. In step 502, it is determined if the user has the privilege to change the level of source control. If not, control flows to step 504, where a status is set to indicate that the action cannot be performed. In this and other flow charts, error or status processing is shown, but it is optional. In various embodiments of the present invention, none or different methods of error or status processing is performed. From step 504, control flows to step 506, where the status is returned. Otherwise, if in step 502, it was determined that the user had the privilege, control flows to step 508.

In step 508, it is determined if "full" source control is licensed. If so, control flows to step 510, where the status is set to indicate that the action cannot be performed and, then, control flows to step 506 where the status is returned. Otherwise, if "full" source control is licensed, control flows to step 512. In step 512, it is determined if the change is from "none" to "basic". If so, control flows to step 514. In step 514, any needed processing is performed to change from "none" to "basic" and, then, control flows to step 516, where the level of support is updated in a database. Otherwise, if it was determined in step 512 that the change was not from "none" to "basic", then control flows to step 518. In step 518, it is determined if the change is from "basic" to "none." If so, any needed processing is performed to change from "basic" to "none" and, then, control flows to step 516, where the level of support is updated in the database and, then, to step 506, where the status is returned.

Some more detailed example methods of changing configurable levels of a source control system follow for migrating from a "none" or no source control system to a "basic" source control system, for migrating from a "basic" source control system to a "full" source control system, and for reverting to a lower level.

Migrating from a "none" or no source control system to a "basic" source control system occurs when a customer purchases a source control system for an existing process control system without any source control in this example. Because there is no way to determine values of certain parameters, such as the original creator of an object, they are left null. However, the creation date is set to be the date of the migration and the version number for each object is set to 1.0.

Migrating from a "basic" source control system to a "full" source control system occurs when a customer purchases a license to upgrade to "full" in this example. The user checks in all of the objects. All of the "basic" parameters associated with each object are maintained by the source control system and are used when each object is checked in for the first time under the "full" system.

Reverting to a lower level of source control occurs when a customer does not renew a "full" license and reverts to "basic" or decides not to use its "basic" source control any-more and to work without source control ("none"). When reverting to "basic" or "none", the version numbers reset to zero. In "basic" the version numbers are then automatically generated, while in "none" they are manually entered from that point on.

Figure 6A:
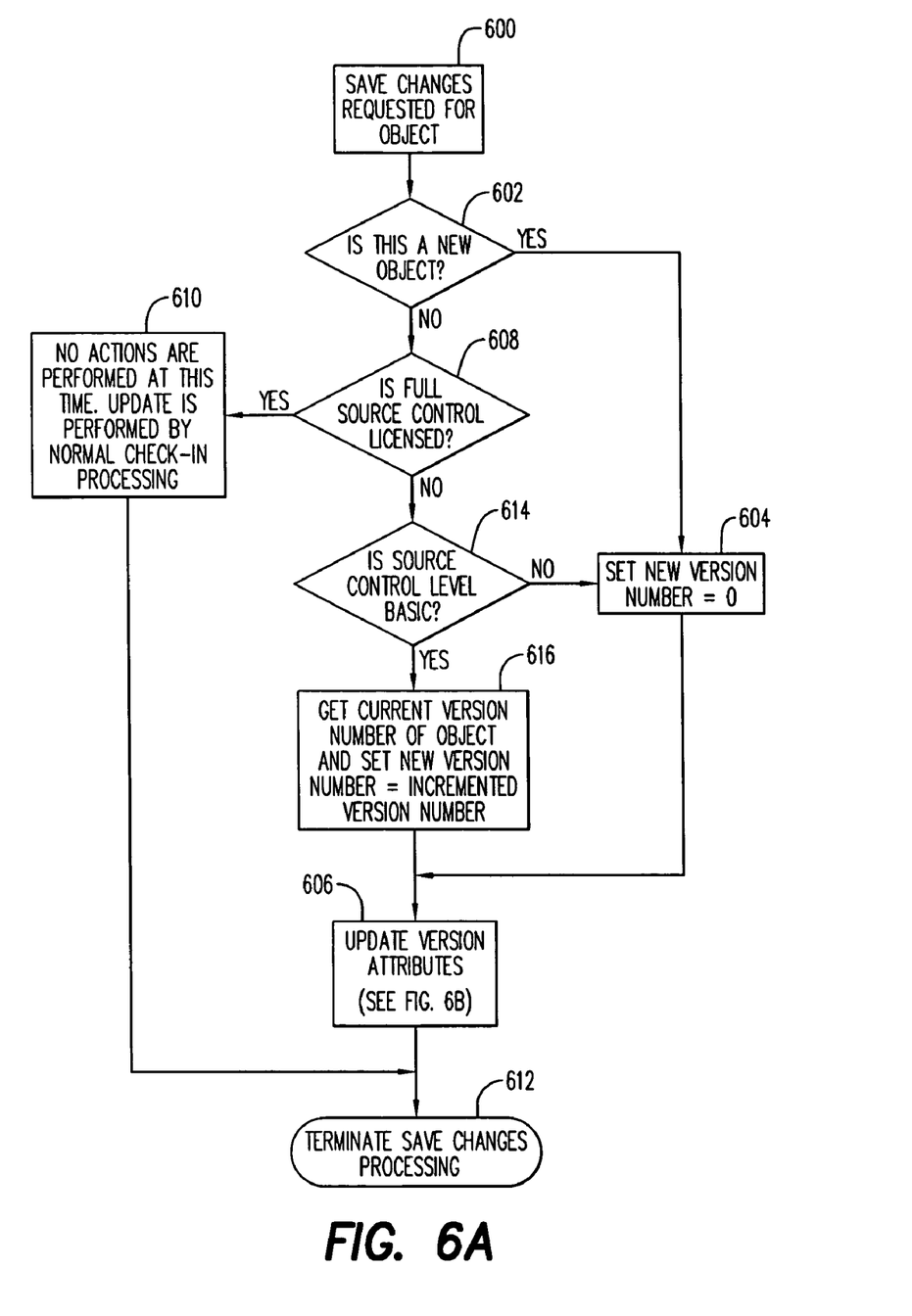
FIGS. 6A and 6B together form a flow chart of an example method for updating version attributes of an object based on the level of source control.
Figure 6B:
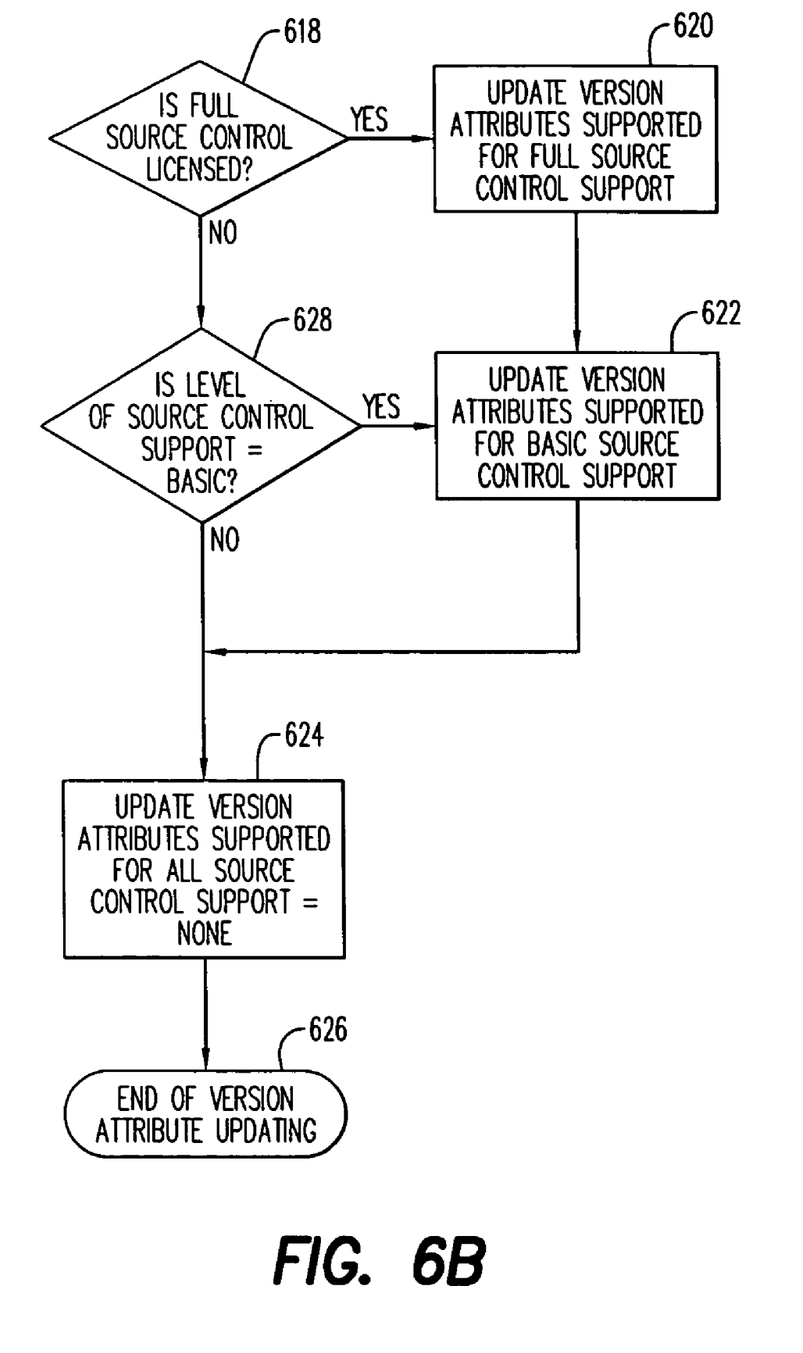

FIGS. 6A and 6B together form a flow chart of an example method for updating version attributes of an object based on the level of source control. Version attributes include information associated with an object, such as the date created, the version number and the like. In step 600, a save changes request for the object is made. In step 602, it is determined whether the object is a new object. If so, control flows to step 604, where a new version number is set to zero and, then, control flows to step 606, where the version attributes are updated. FIG. 6B describes the process of updating the version attributes in more detail. In step 602, if the object is not a new object, then control flows to step 608. In step 608, it is determined whether "full" source control is licensed. If so, control flows to step 610, where no actions are performed at this time and an update is performed by the normal check-in processing and, then, control flows to step 612. In step 612, the method terminates after the save changes request is processed. In step 608, if "full" source control is not licensed, then control flows to step 614. In step 614, it is determined whether the source control level is "basic". If so, control flows to step 616, where the current version number is retrieved, the new version number is set to be an increment of the current version number and, then, control flows to steps 606 and 612.

FIG. 6B describes the process of updating the version attributes of step 606 in FIG. 6A in more detail. In step 618, it is determined whether "full" source control is licensed. If so, control flows to step 620, where the version attributes supported for "full" source control support are updated. Then, control flows to step 622, where the version attributes for "basic" source control support are updated. After step 622, control flows to step 624. In step 624, the version attributes for "none" source control support are updated. Then, control flows from step 624 to step 626, which is the end of version attribute updating. If in step 618, it is determined that "full" source control is not licensed, then control flows to step 628. In step 628, it is determined if the level of source control support is "basic". If so, control flows to step 622, otherwise control flows to step 624. In other words, for "full" source control support, all the attributes for "full", "basic", and "none" are updated; for "basic" source control support, all the attributes for "basic" and "none" are updated; and for "none" source control support, only the attributes for "none" are updated.

Figure 7:
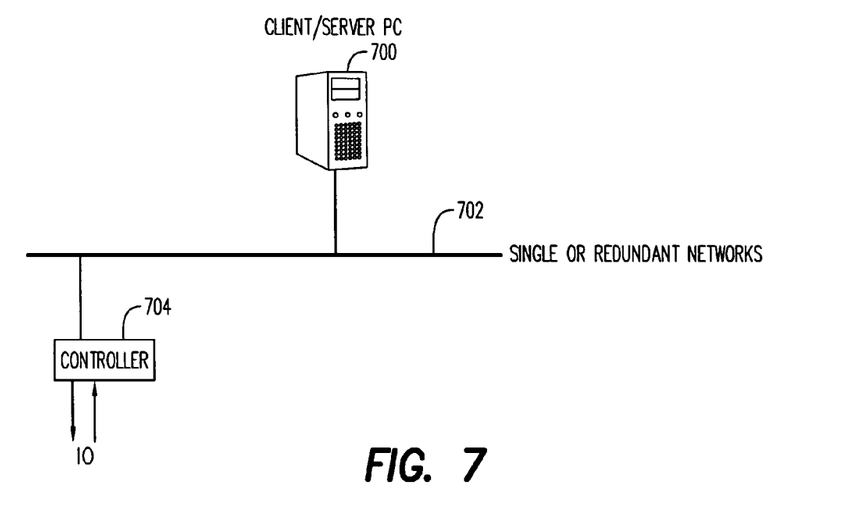
FIG. 7 is a block diagram of an example system architecture for operating a source control system in a process control system.

FIG. 7 shows an example of a system architecture for operating a source control system in a process control system. A client/server PC 700 has a source control system operating on it and is coupled via a network 702 to a controller 704 which communicates with various devices to provide process control. The client/server PC 700 acts as both a client and a server so that a user has access to the source control system and the ability to command a load. Control strategies in a source control system are loaded from client/server 700 to controller 704.

Figure 8:
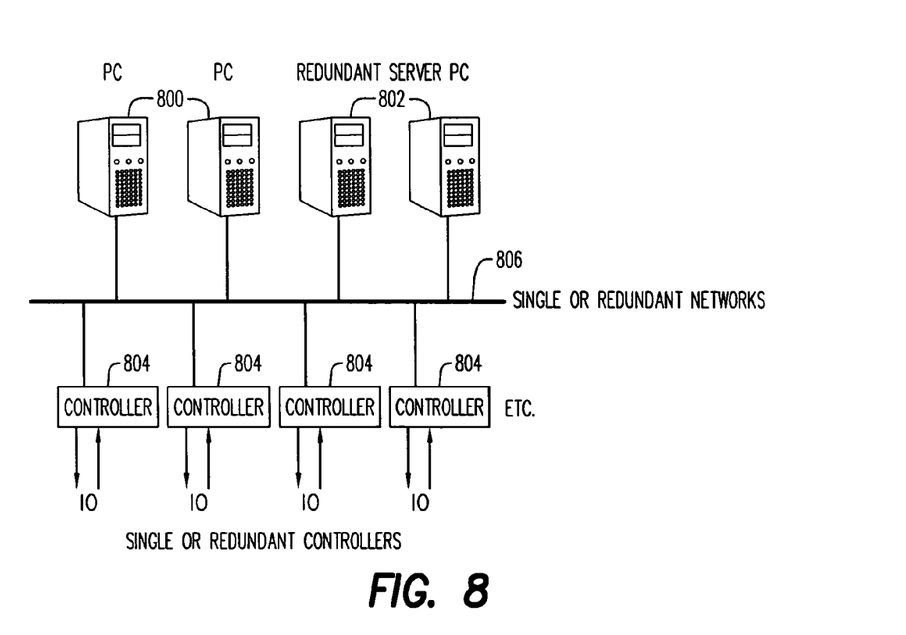
FIG. 8 is a block diagram of another example system architecture for operating a source control system in a process control system.

FIG. 8 shows another example of a system architecture for operating a source control system in a process control system. Client PCs 800 are used by operators to control a plant. Client PCs 800 communicate with redundant server PCs 802. Redundant server PCs 802 are data engines or servers that provide data to and from the plant to client PCs 800. Redundant server PCs 802 are an alternative for greater availability than the single server PC 700 of FIG. 7. When redundant server PCs 802 are used, a back-up server takes over if a primary server fails. Control strategies in a source control system are loaded by PC 800 or server 802 to a controller 804 over a network 806. Controllers 804 communicate with various devices in a process control system.

It is to be understood that the above description is intended to be illustrative and not restrictive. Many other embodiments will be apparent to those of skill in the art upon reviewing the above description, such as adaptations of the present disclosure to source control systems for applications other than process control systems. Various designs using hardware, software, and firmware are contemplated by the present disclosure, even though some minor elements would need to change to better support the environments common to such systems and methods. The present disclosure has applicability to fields outside process control, such as software development environments and other kinds of systems needing control system configuration. Therefore, the scope of the present disclosure should be determined with reference to the appended claims, along with the full scope of equivalents to which such claims are entitled.

What is claimed is:

1. A method of source control, comprising:
 operating a source control system on a computer that is coupled via a network to a controller that communicates with one or more devices to provide process control, wherein said source control system comprises a plurality of source control levels that includes first and second source control levels to control versioning of objects used by said controller to provide said process control;
 receiving a selection of one of said first and second source control levels;
 enabling in said source control system said selected source control level; and
 automatically or manually setting a version number of a first object of said objects, depending on said selected and enabled source control level, wherein said first object is a control strategy loadable to said controller to provide said process control.

2. The method according to claim 1, further comprising:
 providing a capability to switch said enabled source control level of source control to another of said source control levels.

3. The method according to claim 1, wherein automatically setting said version number is based on a degree of change to said first object.

4. The method according to claim 1, further comprising:
 storing attributes associated with said first object in a database.

5. The method according to claim 1, wherein said source control system further comprises a third source control level, and wherein said first, second and third source control levels comprises control level none, control level basic, and control level full.

6. The method according to claim 5, wherein for said control level none, said method further comprises:
 receiving user-entered text for said version number;
 setting a created-by name set upon receiving a first save changes request;
 setting a modified-by name upon receiving a save changes request;
 setting a date-created date upon receiving said first save changes request; and
 setting a version date upon receiving said save changes request.

7. The method according to claim 5, wherein for said control level basic, said method further comprises:

automatically incrementing said version number upon receiving a save changes request, including a first save changes request;
setting a created-by name upon receiving said first save changes request;
setting a modified-by name upon receiving said save changes request, including a first save changes request;
setting a date-created date upon receiving said first save changes request;
setting a version date upon receiving said save changes request, including a first save changes request; and
displaying said version number.

8. The method according to claim 7, wherein said version number is incremented differently for minor changes than for major changes.

9. The method according to claim 5, wherein for said control level full, said method further comprises:
supporting a qualification life cycle model;
providing a version control system toolbar and menu;
automatically incrementing said version number upon check-in, including a first check-in wherein said version number is generated;
displaying said version number;
setting a created-by name upon said first check-in;
setting a modified-by name upon said check-in, including said first check-in;
setting a date-created date upon said check-in, including said first check-in;
setting a version date upon said check-in;
receiving a check-in comment; and
providing a version history and audit trail.

10. The method according to claim 9, wherein said version number is incremented differently for minor changes than for major changes, according to user preferences.

11. A process control system, comprising:
a network coupling a computer to a controller that communicates with one or more devices to provide process control;
wherein said computer comprises a source control system with a selectable control level of source control that is selected from a plurality of control levels of source control, wherein said plurality of control levels comprise a first source control level and a second source control level that contains one or more features not contained in said first source control level, wherein version numbers are set manually and automatically in said first and second source control levels, respectively, wherein said source control system controls versioning of at least one control strategy for said process control; and
wherein said at least one control strategy is loadable from said computer to said controller to provide said process control according to said control strategy.

12. The system according to claim 11, further comprising:
a database to store source control information associated with said at least one control strategy, including a version number.

13. The system according to claim 12, wherein said selectable source control level is no source control and further wherein a version number is entered manually when said at least one control strategy is saved.

14. The system according to claim 12, wherein said selectable source control level is basic source control and further wherein a version number is automatically incremented when said at least one control strategy is saved.

15. The system according to claim 12, wherein said selectable source control level is full source control and further wherein a version number is automatically incremented when said at least one control strategy is checked-in.

16. The system according to claim 11, wherein said selectable source control level is selected from the group consisting of: a preference, a license, an installation configuration, and a user interface.

17. A method for providing a source control system for a process control system, comprising:
operating said source control system on a computer that is coupled via a network to a controller that communicates with one or more devices to provide process control, wherein said source control system comprises a plurality of source control levels to control versioning of objects;
receiving in said source control system a selection from said plurality of control levels for a first object of said objects;
providing a user-enterable version number when said first object is stored, if said selection is a first source control level of said plurality of source control levels; and
providing an automatically incremented version number when said first object is stored, if said selection is a second source control level of said plurality of source control levels, wherein said first object is a control strategy loadable to said controller to provide said process control.

18. The method according to claim 17, further comprising:
providing an automatically incremented version number when said first object is checked-in, if said selection is a third source control level of said plurality of control levels of source control.

19. The method according to claim 17, further comprising:
changing said selection to another of said plurality of source control levels.

20. The method according to claim 17, further comprising:
updating attributes of said object based on said selection.

21. A computer readable medium having executable instructions stored thereon to perform a method of providing configurable control levels of support for a source control system, said method comprising:
operating said source control system on a computer that is coupled via a network to a controller that communicates with one or more devices to provide process control;
receiving a request for one of a plurality of control levels of source control of support of at least one control strategy for said process control, wherein said plurality of control levels of source control comprises full, basic and none, wherein version numbers are set automatically in said control levels of full and basic and manually in said control level of none;
determining whether said full control level is licensed for said at least one control strategy;
determining whether an option for said basic control level is selected for said at least one control strategy;
setting said control level of support to full, if said full control level is licensed;
setting said control level of support to basic if said option is selected, wherein said at least one control strategy is loadable from said computer to said controller to provide said process control according to said at least one control strategy; and
setting said control level of support to none as a default.

22. A computer readable medium having executable instructions stored thereon to perform a method of changing configurable control levels of source control for a source control system, said method comprising:
operating said source control system on a computer that is coupled via a network to a controller that communicates with one or more devices to provide process control, wherein said source control system controls versioning of objects;

receiving a request from a user to change a control level of source control of a first object of said objects;

determining whether a full control level of source control is licensed for said first object;

determining whether said request is to change said requested control level from a control level of source control of none to basic, wherein version numbers are set manually and automatically in said source control levels of none and basic, respectively;

determining whether said request is to change said requested control level from a control level of source control of basic to none;

performing said request when said request is to change said requested control level from none to basic or from basic to none to a new control level of source control; and storing said new control level of source control for said first object, which is loadable from said computer to said controller to provide said process control according to said first object.

23. A computer readable medium having executable instructions stored thereon to perform a method of updating version attributes based on a control level of source control, said method comprising:

operating said source control system on a computer that is coupled via a network to a controller that communicates with one or more devices to provide process control, wherein said source control system controls versioning of objects;

determining a selected one of a plurality of control levels of source control that comprises a basic control level and a full control level by:
  determining whether said full control level of source control of a first object of said objects is licensed;
  determining whether said basic control level is selected;
receiving a save changes request for said first object; and
determining whether said first object is new;
setting a version number to a first version number, when said first object is new;
updating version attributes of said first object according to whether said full control level is licensed and whether said basic control level is selected; and
incrementing said version number, when said first object is not new and when said full control level is not licensed, wherein said first object is loadable from said computer to said controller to provide said process control according to said object; and
setting a version number for said first object based on a user-enterable number if said full control level is not licensed and if said basic control level is not selected.

* * * * *